(12) United States Patent
Hiller

(10) Patent No.: US 8,587,248 B2
(45) Date of Patent: Nov. 19, 2013

(54) METHOD FOR CONTROLLING A POLYPHASE CONVERTER WITH DISTRIBUTED ENERGY STORES AT LOW OUTPUT FREQUENCIES

(75) Inventor: Marc Hiller, Lauf an der Pegnitz (DE)

(73) Assignee: Siemens Aktiengesellschaft, München (DE)

( * ) Notice: Subject to any disclaimer, the term of this patent is extended or adjusted under 35 U.S.C. 154(b) by 502 days.

(21) Appl. No.: 12/933,179

(22) PCT Filed: Nov. 11, 2008

(86) PCT No.: PCT/EP2008/065270
§ 371 (c)(1),
(2), (4) Date: Sep. 17, 2010

(87) PCT Pub. No.: WO2009/115141
PCT Pub. Date: Sep. 24, 2009

(65) Prior Publication Data
US 2011/0018481 A1 Jan. 27, 2011

(30) Foreign Application Priority Data
Mar. 19, 2008 (DE) .......................... 10 2008 014 898

(51) Int. Cl.
*H02P 27/04* (2006.01)

(52) U.S. Cl.
USPC ........ 318/800; 318/722; 318/801; 363/21.01; 363/34; 363/40; 363/55; 363/131

(58) Field of Classification Search
USPC ......... 318/800, 801, 722, 713, 599, 807, 808; 363/40, 41, 44, 55, 10, 15, 21.01, 34, 363/45, 71, 99, 120, 123, 124, 131, 159
See application file for complete search history.

(56) References Cited

U.S. PATENT DOCUMENTS 5,831,842 A * 11/1998 Ogasawara et al. ............. 363/40
5,986,909 A * 11/1999 Hammond et al. ............. 363/65
(Continued)

FOREIGN PATENT DOCUMENTS

DE 101 03 031 A 1 7/2002
DE 10 2005 041 087 A1 3/2007
(Continued)

OTHER PUBLICATIONS

R. Marquardt, A. Lesnicar, J. HildingeETG-Tagung 2002; Book; 2002.
(Continued)

*Primary Examiner* — Antony M Paul
(74) *Attorney, Agent, or Firm* — Henry M. Feiereisen LLC

(57) ABSTRACT

The invention relates to a method for controlling a multi-phase power converter having at least two phase modules (100) comprising valve branches (T1, . . . , T6) having bipolar subsystems (10, 11) connected in series, at low output frequencies (f). According to the invention, a target value (u1 (t), . . . , u6 (t)) of a valve branch voltage overlaps a common-mode voltage (uCM(t)) such that a sum of two valve branch voltages (u1 (t), U2 (t) or U3 (t), U4 (t) or U5 (t), U6 (t)) of each phase module (100) equals an intermediate circuit voltage (Ud) of said multi-phase power converter. In this manner a known converter having a triphase power converter comprising distributed energy accumulators on the grid and load side, or merely on the load side, may be utilized as a drive converter, which may start up from the idle state.

8 Claims, 6 Drawing Sheets

(56) References Cited

U.S. PATENT DOCUMENTS

| | | | |
|---|---|---|---|
| 7,106,025 B1 * | 9/2006 | Yin et al. | 318/811 |
| 7,869,236 B2 | 1/2011 | Mohan et al. | |
| 2007/0026872 A1 | 2/2007 | Fiegert et al. | |
| 2008/0310205 A1 | 12/2008 | Hiller | |

FOREIGN PATENT DOCUMENTS

| | | |
|---|---|---|
| DE | 10 2005 045 090 A1 | 4/2007 |
| EP | 1 253 706 A1 | 10/2002 |
| RU | 2119711 C1 | 3/2009 |
| WO | WO 2007/033852 A2 | 3/2007 |
| WO | WO 2007/139800 A2 | 12/2007 |

OTHER PUBLICATIONS

A. Lesnicar, R. Marquardt IEEE Bologna PowerTech Conference, Jun. 23-26, 2003, Bologna, Italy.

M. Veenstra, Prof. A. Rufer Conference Record of the 2003 IEEE Industry Applications Conference; IAS Annual Meeting, Salt Lake City Oct. 12-16, 2003; Others; 2003; US.

K.A.Corzine, S.Lu Electric Ship Technologies Symposium, 2005 IEEE Philadephia USA, Jul. 25-27, 2005, Seiten 355-362; Others; 2005; US.

Shuai Lu, Keith A.Corzine Power Electronics and Motion Control Conference, IPMC'06, Jan. 8, 2006, Seiten 1-5; Others; 2006.

* cited by examiner

_US 8,587,248 B2_

METHOD FOR CONTROLLING A POLYPHASE CONVERTER WITH DISTRIBUTED ENERGY STORES AT LOW OUTPUT FREQUENCIES

CROSS-REFERENCES TO RELATED APPLICATIONS

This application is the U.S. National Stage of International Application No. PCT/EP2008/065270, filed Nov. 11, 2008, which designated the United States and has been published as International Publication No. WO 2009/115141 A1 and which claims the priority of German Patent Application, Serial No. 10 2008 014 898.9, filed Mar. 19, 2008, pursuant to 35 U.S.C. 119(a)-(d).

BACKGROUND OF THE INVENTION

The invention relates to a method for controlling a converter with at least two phase modules having an upper and a lower valve branch having in each case two two-pole subsystems connected in series at low output frequencies.

Such a converter with distributed energy stores is known from the publication "Modulares Stromrichterkonzept für Netzkupplungsanwendung bei hohen Spannungen", by Rainer Marquardt, Anton Lesnicar and Jüml urgen Hildinger" [Modular Converter Concept for System Coupling Application at High Voltages], printed in the conference proceedings of the ETG Conference 2002. In this publication, such a converter is used for a system-side and load-side converter, with these two converters being coupled to one another with distributed energy stores on the DC-voltage side.

FIG. 1 shows in more detail such a converter with distributed energy stores. In accordance with this circuit arrangement, this known converter circuit has three phase modules, which are each denoted by 100. These phase modules 100 are connected electrically conductively on the DC-voltage side in each case to a connection P or N with a positive or negative DC voltage busbar $P_0$ or $N_0$. A DC voltage $U_d$ is present between these two DC voltage busbars $P_0$ and $N_0$. Each phase module 100 has an upper and a lower valve branch T1 or T3 or T5 and 12 or T4 or T6. Each of these valve branches T1 to T6 has a number of two-pole subsystems 10 which are connected electrically in series. In this equivalent circuit diagram, four subsystems 10 are illustrated per valve branch T1, ..., T6. Each node between two valve branches T1 and T2 or T3 and T4 or T5 and T6 of a phase module 100 forms a connection L1 or L2 or L3 of this phase module 100 on the AC-voltage side.

FIG. 2 shows in more detail an embodiment of a known two-pole subsystem 10. The circuit arrangement shown in FIG. 3 represents a functional equivalent variant. These two subsystems 10 and 11 are described in more detail in DE 101 03 031 A1, which laid-open specification also describes the way in which said subsystems operate.

A further embodiment of a two-pole subsystem 20 is shown in more detail in FIG. 4. This embodiment of the two-pole subsystem 20 is known from DE 10 2005 041 087 A1. The design of this two-pole subsystem 20 and the way in which it operates are described in detail in this laid-open specification, and therefore no explanation in relation to this is necessary at this juncture.

The number of independent energy stores 9 and 29, 30 which are connected in series between a positive connection P and a connection L1 or L2 or L3 of a phase module 100 on the AC-voltage side is referred to as the series operating cycle n. It is advantageous here, but not absolutely necessary, to implement the same series operating cycle n between a connection L1 or L2 or L3 on the AC-voltage side and a negative connection N of a phase module 100. As shown in FIG. 1, each valve branch T1, ..., T6 of the polyphase converter has four two-pole subsystems 10, which are connected electrically in series. Since these subsystems 10 each have only one independent energy store 9, a series operating cycle of n=4 results. If, instead of these subsystems 10, four subsystems 20 are used as shown in FIG. 2, this results in a series operating cycle n=8 since each subsystem 20 has two independent energy stores 29 and 30.

For the following explanation it is assumed that all of the energy stores 9 of the subsystems 10 of each valve branch T1, ..., T6 of this polyphase converter are each charged to the same voltage $U_c$. A method for charging this energy store 9 is described, for example, in the conference proceedings for the ETG Conference 2002.

The voltages $u_1(t), \ldots, u_6(t)$ at the valve branches T1, ..., T6, also referred to as valve branch voltage $u_1(t), \ldots, u(t)$, comprise a DC variable $\frac{1}{2}U_d$ and an AC voltage variable $u_{10}(t), u_{20}(t), u_{30}(t)$. This AC voltage variable $u_{10}(t)$ or $u_{20}(t)$ or $u_{30}(t)$ has, firstly a frequency and an amplitude of a desired output voltage of the converter. These AC variables $u_{10}(t), u_{20}(t)$ and $u_{30}(t)$ are related to a fictitious mid-point 0 between the two DC voltage busbars $P_0$ and $N_0$, as shown in FIG. 1. This results in sinusoidal converter output voltages $u_{10}(t), u_{20}(t)$ and $u_{30}(t)$, wherein the following must apply for the amplitudes of the voltages $u_{10}(t), u_{20}(t)$ and $u_{30}(t)$ related to the mid-point 0: each amplitude of an AC voltage variable $u_{10}(t), u_{20}(t)$ and $u_{30}(t)$ should always be less than half the DC voltage $U_d$. The voltage $u_1(t)$ or $u_2(t)$ or $u_3(t)$ or $u_4(t)$ or $u_5(t)$ or $u_6(t)$ of a valve branch T1 or T2 or T3 or T4 or T5 or T6 must therefore always be positive since all of the two-pole subsystems 10 of a valve branch T1, ..., T6 which are connected in series can generate only a short circuit or a positive voltage at the output terminals X1 and X2 of each two-pole subsystem 10, irrespective of the valve branch current direction in all switching states. Owing to the structure of these two-pole subsystems 10, 11 and 20, negative voltages are not possible. Therefore, the valve voltage $u_1(t)$ or $u_2(t)$ or $u_3(t)$ or $u_4(t)$ or $u_5(t)$ or $u_6(t)$ of each valve branch T1 or T2 or 13 or T4 or 15 or 16 can vary between zero and n times a capacitor voltage $U_c$ of the n independent energy stores 9 and, respectively, 29, 30.

FIG. 5 shows a characteristic of the valve branch voltage $u_1(t)$ and of the valve branch current $i_1(t)$ of the valve branch T1 of the phase module 100 of the polyphase converter shown in FIG. 1 in a graph over time t. If the two characteristics are multiplied by one another, the time characteristic of an instantaneous power $P_{T1}(t)$ of this valve branch T1 is produced, which is illustrated in a graph over time t in FIG. 6. If this instantaneous power $P_{T1}(t)$ of the valve branch T1 is integrated over a period of the valve branch voltage $u_1(t)$ (corresponds to the areas below the curved sections of the curve of the instantaneous power $P_{T1}(t)$), in the steady state the value zero is always reached. This means that the energy stores 9 of the two-pole subsystems 10 in this valve branch T1 in total do not receive or emit any energy. The same also applies to all of the other valve branches T2, ..., T6 of the polyphase converter shown in FIG. 1.

It follows from this that the energy content of each energy store 9 of each valve branch T1, ..., T6 of the polyphase converter shown in FIG. 1 and therefore of this polyphase converter is constant in the steady state. For this reason, these two-pole subsystems 10 and 11 and 20 also do not require an active power feed to the respective DC voltage connections of the energy stores 9 and 29, 30, respectively.

An energy content of each energy store 9 or 29, 30 of the two-pole subsystems 10, 11 and 20, respectively, of each valve branch T1, . . . , T6 is advantageously dimensioned in accordance with the maximum required energy deviation. It is necessary here to take into account the fact that the voltage ripple $\Delta U$ which is superimposed on the steady-state voltage mean value in the energy stores 9 and 29,30 should not overshoot a maximum predetermined limit value. This maximum voltage is determined by the dielectric strength of the semiconductor switches and energy stores 9 and 29, 30 which can be switched off and are used in the two-pole subsystems 10, 11 and 20, respectively, and also by means of regulation technology. A decisive factor in the dimensioning of the energy stores 9 and 29, 30 is the output frequency of the polyphase converter shown in FIG. 1. The lower this output frequency is, the greater the energy deviation is per period in the energy store 9 or 29, 30. This means that, for a predetermined voltage ripple $\Delta U$, the required variable of the energy stores 9 and 29, 30 of the two-pole subsystems 10, 11 and 20, respectively, would tend towards infinity in hyperbolic fashion as the frequency decreases up to the DC voltage operating mode (frequency equal to zero).

This relationship between the voltage ripple $\Delta U$ and the output frequency f of the polyphase converter shown in FIG. 1 is illustrated in a graph shown in FIG. 7. This graph shows a hyperbolic curve A for the voltage ripple of an energy store (continuous line) and a hyperbolic curve B for the voltage ripple when using three partial energy stores in parallel per energy store 9 or 29, 30, i.e. three times the intermediate-circuit capacitance (dashed line). The hyperbolic curve A shows that, starting from an output frequency f=50 Hz, the voltage ripple $\Delta U$ increases substantially as the frequency decreases. If at half the output frequency the voltage ripple $\Delta U$ should be equal to the voltage ripple $\Delta U$ at the output frequency f=50 Hz, the value of an energy store 9 or 29, 30 of a two-pole subsystem 10, 11 or 20 must be a multiple greater.

The graph in FIG. 8 shows a characteristic of the valve branch voltage $u_1(t)$ with an output frequency f=50 Hz and a characteristic of this valve branch voltage $u_1(t)$ at an output frequency of f=5 Hz over time t. The amplitude of the valve branch voltage $u_1(t)$ at an output frequency f=5 Hz has been decreased corresponding to a u/f characteristic. If a recalculation is performed taking into consideration the corresponding valve branch current in the valve branch T1 of the polyphase converter shown in FIG. 1, an associated instantaneous power $P_{T1}(t)$ at an output frequency f=50 Hz and f=5 Hz is produced. These two characteristics of the instantaneous power $P_{T1}(t)$ of the valve branch T1 are shown in the graph in FIG. 9 over time t. The energy deviation at the output frequency f=5 Hz has risen substantially in comparison with the energy deviation at the output frequency f=50 Hz. In this example illustrated, the energy deviation at f=5 Hz is 25 times greater than at f=50 Hz.

In order to produce the same voltage ripple $\Delta U$ as at the output frequency f=50 Hz in this operating point as well (f=5 Hz), the energy store 9 or 29, of the two-pole subsystems 10, 11 or 20 would need to be dimensioned to be a factor of 25 greater.

In order to arrive at a solution which is attractive in terms of size and costs, it is advantageous if the design of the energy stores 9 and 29, 30 of the two-pole subsystems 10, 11 and 20, respectively, of the valve branches T1, . . . , T6 of the polyphase converter shown in FIG. 1 is performed for a rated working point. This means that, in this rated working point, the energy deviation already results in a predetermined maximum permissible voltage ripple $\Delta U$. For operation at low frequencies, i.e. below a rated frequency $f_N$, up to purely DC operation (f=0 Hz), as arises when running up drives, the control methods in accordance with the prior art cannot be used for a realistic and competitive design of the energy stores 9 and 29, 30 of two-pole subsystems 10, 11 and 20 used.

SUMMARY OF THE INVENTION

The invention is now based on the object of specifying a method for controlling a polyphase converter with distributed energy stores, which enables operation at low output frequencies up to the DC operating mode.

This object is achieved according to the invention by a method for controlling a polyphase converter at a low output frequency, the converter comprising at least two phase modules, each phase module having an upper and a lower valve branch, with each of the upper and a lower valve branches each comprising at least two two-pole subsystems connected in series, the method comprising superimposing a common-mode voltage on a setpoint value of a voltage of the upper and lower valve branches such that a sum of the voltages of the upper and lower valve branch of each phase module is equal to an intermediate circuit voltage of the polyphase converter.

In accordance with the invention, a common mode voltage is superimposed on a setpoint value of all of the valve branch voltages of the polyphase converter with distributed energy stores. Since this superimposed AC voltage simultaneously alters the potentials of all three connections, on the AC-voltage side, of the polyphase converter with distributed energy stores in comparison with the potentials of the DC voltage busbars thereof, this modulated AC voltage is referred to as the common mode voltage. The superimposed common mode voltage ensures that the line-to-line output voltages of the polyphase converter with distributed energy stores remain unaffected.

In an advantageous embodiment of the method according to the invention, the common mode voltage is predefined in such a way that the voltage ripple of all of the energy stores 9 and 29, 30 does not overshoot a predetermined maximum value. As a result, the maximum voltage at the energy stores likewise remains below a predetermined maximum value, which is selected in accordance with the dielectric strength of the semiconductors and energy stores.

In a further advantageous embodiment of the method according to the invention, the common mode voltage is predefined in such a way that in each case a predetermined maximum value for the valve branch currents is not overshot. As a result, on-state losses and switching losses which occur in the semiconductor switches which can be switched off of the two-pole subsystems used are restricted to a value.

In a further advantageous embodiment of the method according to the invention, the amplitude of the common mode voltage is inversely proportional to the rise in the output frequency. This means that this common mode voltage is only effective in a frequency band below a rated frequency.

Further advantageous configurations of the method according to the invention are set forth in the dependent claims.

In order to further explain the invention, reference is made to the drawing, which is used to explain the method according to the invention in greater detail.

BRIEF DESCRIPTION OF THE DRAWING

FIG. 5 illustrates a graph over time t of a valve branch voltage and an associated valve branch current, whereas

DETAILED DESCRIPTION OF PREFERRED EMBODIMENTS

As has already been described at the outset, the following equations apply to the time characteristics of the valve branch voltages $u_1(t), \ldots, u_6(t)$:

$$u_1(t) \sim \tfrac{1}{2} \cdot U_d - u_{10}(t),$$

$$u_2(t) \sim \tfrac{1}{2} \cdot U_d + u_{10}(t),$$

$$u_3(t) \sim \tfrac{1}{2} \cdot U_d - u_{20}(t),$$

$$u_4(t) \sim \tfrac{1}{2} \cdot U_d + u_{20}(t),$$

$$u_5(t) \sim \tfrac{1}{2} \cdot U_d - u_{30}(t),$$

$$u_6(t) \sim \tfrac{1}{2} \cdot U_d + u_{30}(t).$$

This means that each valve branch T1, ..., T6 at each time always produces half the DC voltage $U_d$ between the DC voltage busbars $P_0$ and $N_0$ which are common to all of the phase modules 100. A sinusoidal component with a predetermined frequency and a desired amplitude of a converter output voltage $u_{10}(t)$, $u_{20}(t)$ or $u_{30}(t)$, which is related to a fictitious mid-point between the voltage busbars $P_0$ and $N_0$, is generally superimposed on this direct current variable.

According to the invention, in each case a common mode voltage $u_{CM}(t)$ is superimposed on these valve branch voltages $u_1(t), \ldots, u_6(t)$ in such a way that the line-to-line output voltages continue to be excluded thereby. The following equations then apply to the time characteristics of these valve branch voltages $u_1(t), \ldots, u_6(t)$.

$$u_1(t) \sim \tfrac{1}{2} \cdot U_d - u_{10}(t) + u_{CM}(t),$$

$$u_2(t) \sim \tfrac{1}{2} \cdot U_d + u_{10}(t) - u_{CM}(t),$$

$$u_3(t) \sim \tfrac{1}{2} \cdot U_d - u_{20}(t) + u_{CM}(t),$$

$$u_4(t) \sim \tfrac{1}{2} \cdot U_d + u_{20}(t) - u_{CM}(t),$$

$$u_5(t) \sim \tfrac{1}{2} \cdot U_d - u_{30}(t) + u_{CM}(t),$$

$$u_6(t) \sim \tfrac{1}{2} \cdot U_d + u_{30}(t) - u_{CM}(t).$$

Figure 10:
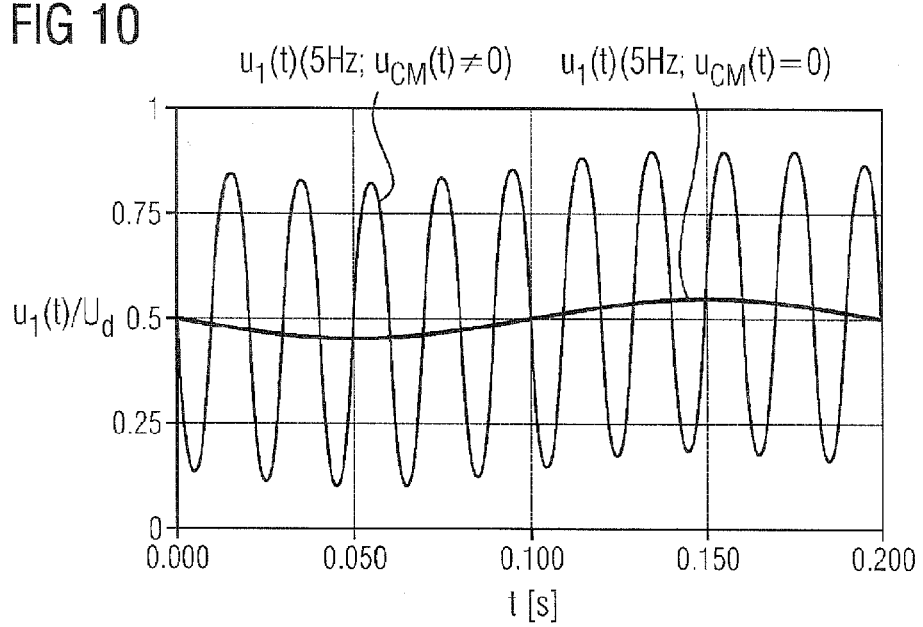
FIG. 10 shows a graph over time t of a valve branch voltage at an output frequency f=5 Hz with a common mode voltage which is unequal or equal to zero.

The graph in FIG. 10 illustrates a valve branch voltage $u_1(t)$ at an output frequency f=5 Hz with a common mode voltage $u_{CM}(t)$ which is once not equal to zero and is once equal to zero over time t. It can be seen from the signal characteristic of the valve branch voltage $u_1(t)$ with a superimposed common mode voltage $u_{CM}(t)$ which is not equal to zero that this common mode voltage $u_{CM}(t)$ is sinusoidal and the amplitude thereof is dimensioned such that the peak value $\hat{u}_1(t)$ of the valve branch voltage $u_1(t)$ adheres to an upper boundary condition such that the following applies:

$$0 < u_1(t) < U_d$$

Figure 9:
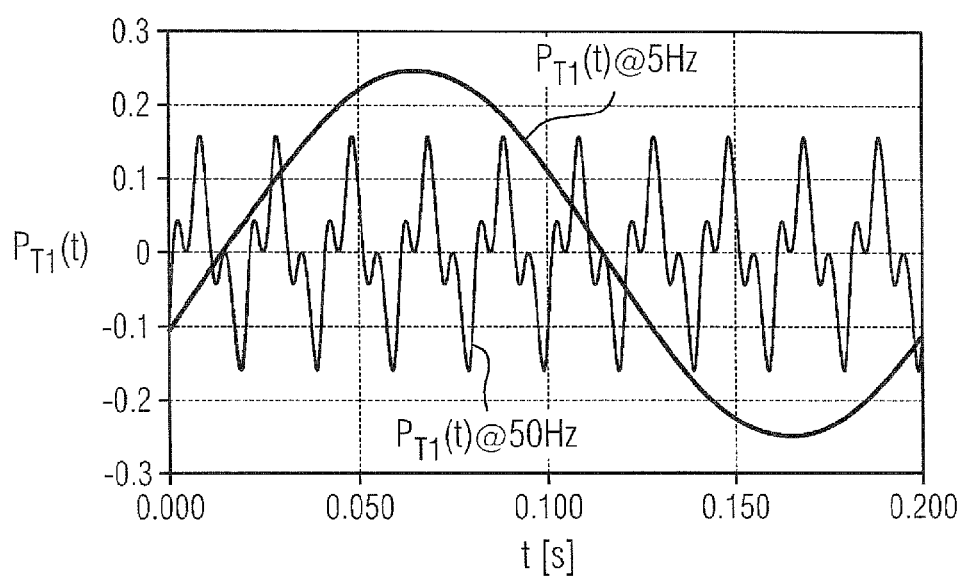
FIG. 9 shows a graph over time t of associated instantaneous powers.

Since output converter currents $i_{L1}(t)$, $i_{L2}(t)$ and $i_{L3}(t)$, also referred to as load currents $i_{L1}(t)$, $i_{L2}(t)$ and $i_{L3}(t)$, and therefore also the valve branch powers $P_{T1}(t), \ldots, P_{T6}(t)$ of each valve branch T1, ..., T6 during operation at a low output frequency f up to an output frequency f=0 (DC operating mode) in the time characteristic now only have very few zero points, or no zero points at all (FIG. 9), the balancing of the energy stores 9 within a voltage branch T1, ..., T6 and therefore within an electrical period of a converter output voltage $u_{10}(t)$, $u_{20}(t)$ or $u_{30}(t)$ is now no longer sufficient, in contrast to operation at the rated frequency $f_N$ given the same energy store size. The periods in which a respectively constant valve current direction is applied to the valve branches T1, ..., T6 are too long during operation without any modulated common mode voltage $u_{CM}(t)$. As a result, the energy stores 9 and 29, 30 of the two-pole subsystems 10, 11 and 20 used are discharged or charged excessively, which would result in an impermissibly high voltage ripple ΔU in the two-pole subsystems 10, 11 and 20.

Figure 1:
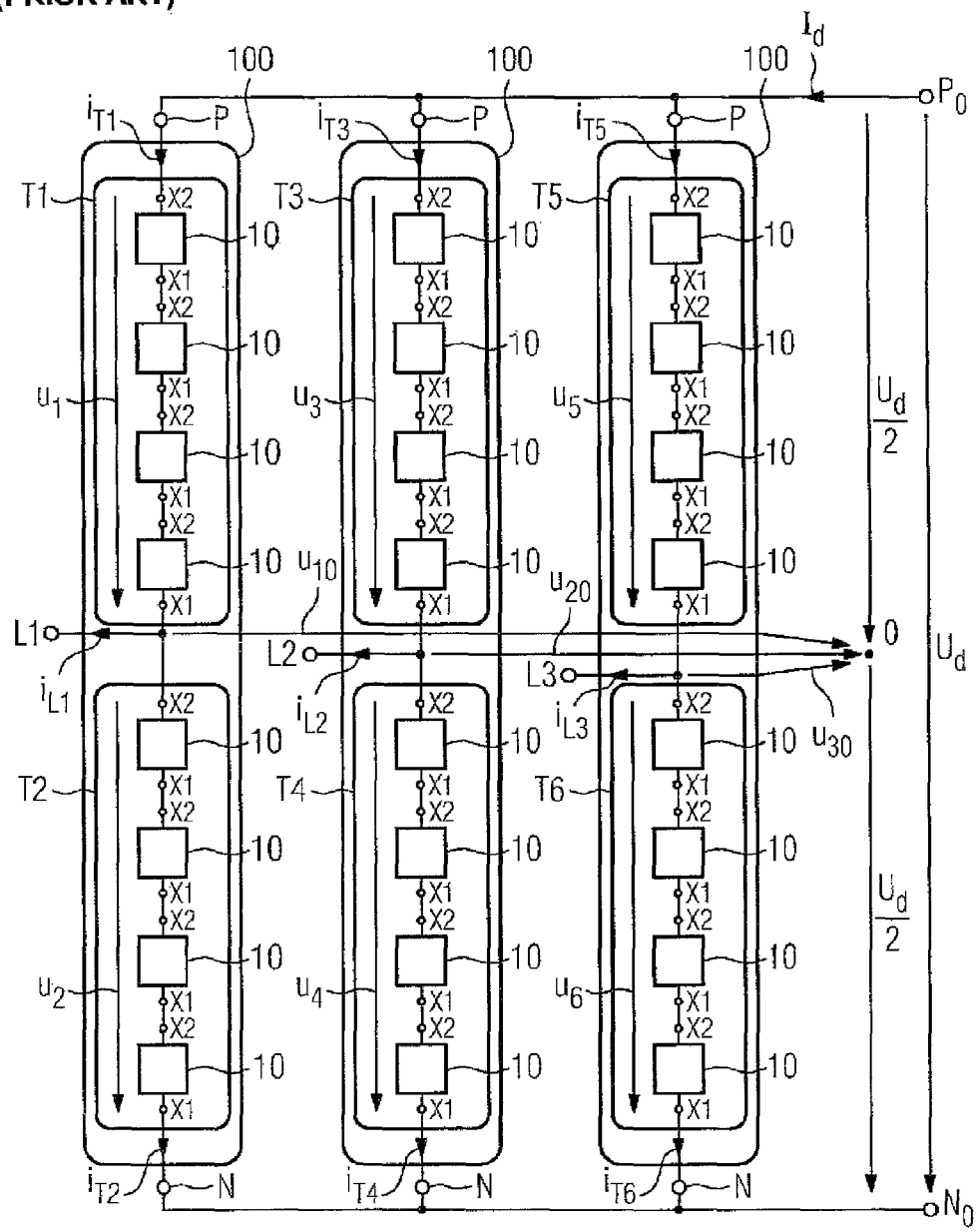
FIG. 1 shows a circuit diagram of a known three-phase converter with distributed energy stores, FIGS. 2 to 4 each show an equivalent circuit diagram of a two-pole subsystem of the converter shown in FIG. 1.
Figure 2:
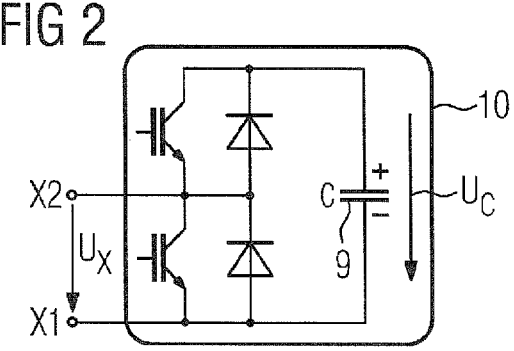
Figure 3:
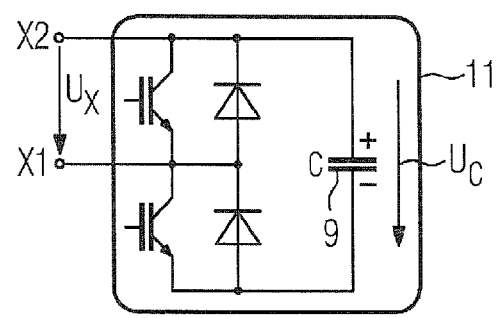
Figure 4:
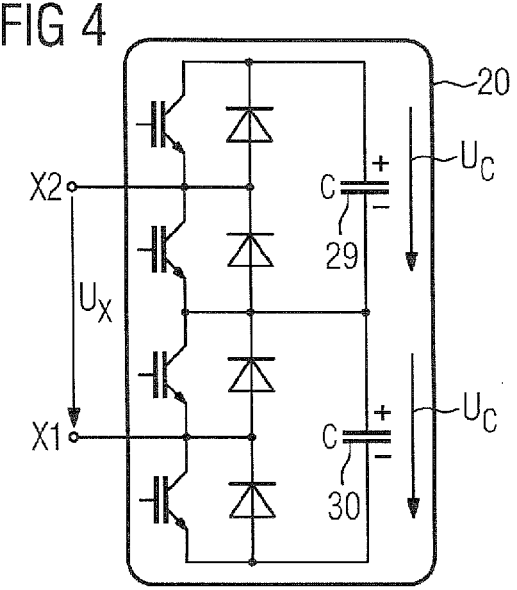
Figure 5:
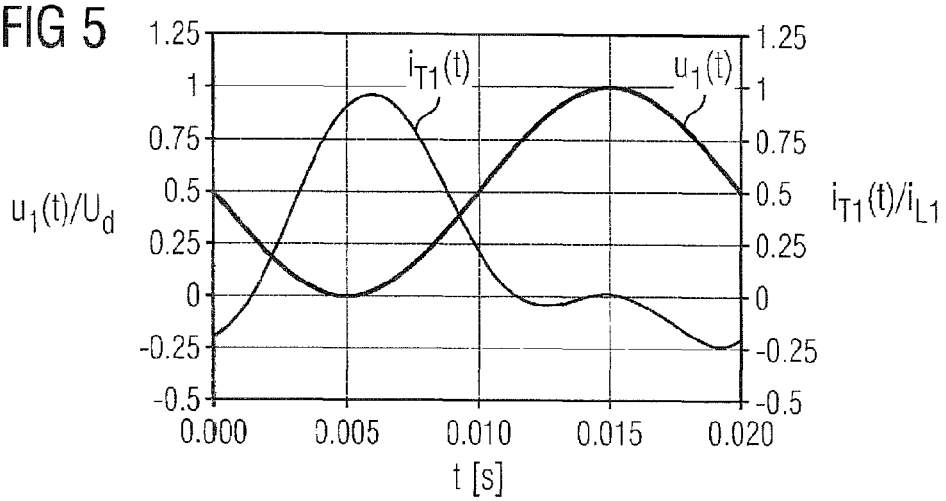
Figure 6:
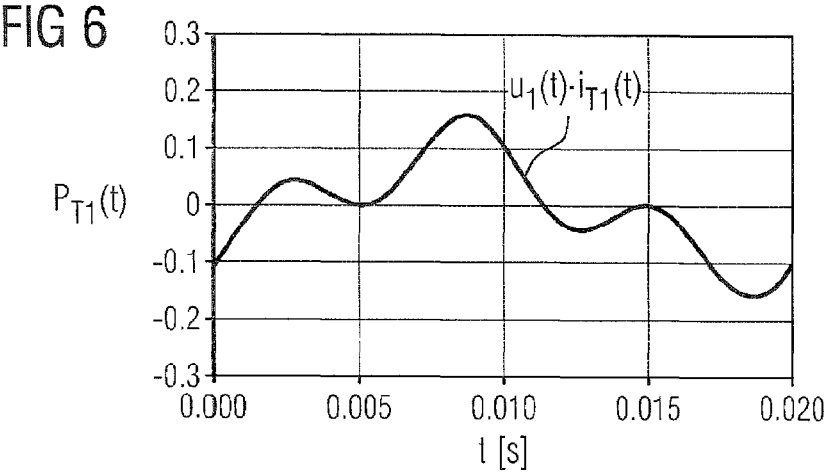
FIG. 6 illustrates a graph over time t of an instantaneous power corresponding to the valve branch voltage and valve branch current shown in FIG. 5 over time t.
Figure 7:
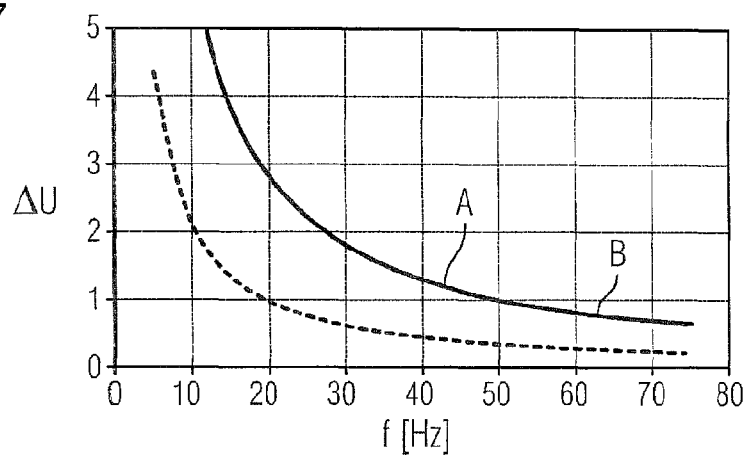
FIG. 7 shows a graph of the voltage ripple as a function of the output frequency of the converter shown in FIG. 1.
Figure 8:
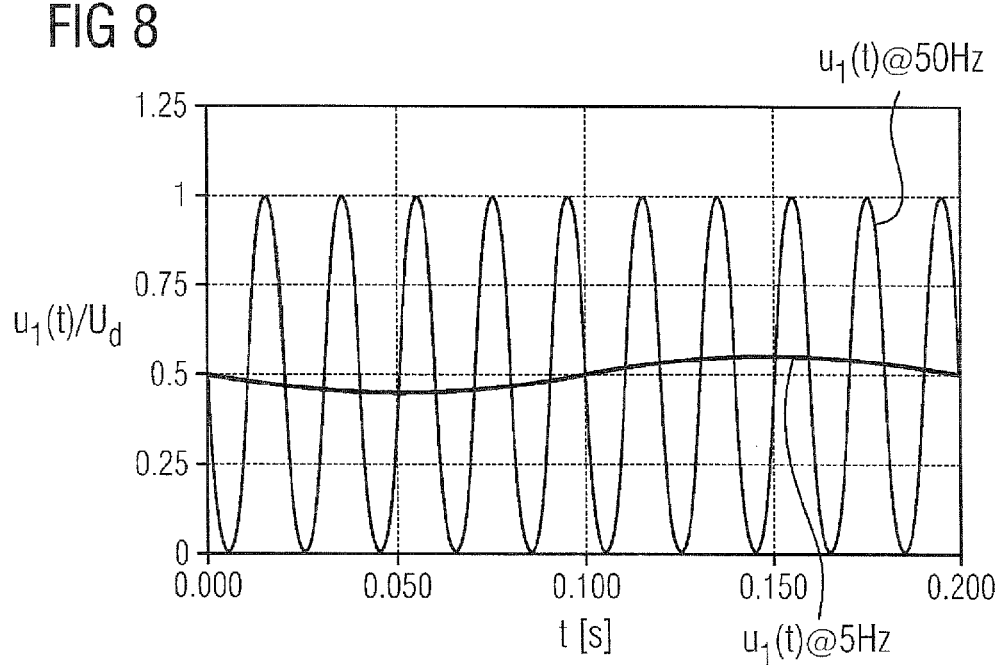
FIG. 8 shows a graph over time t of a valve branch voltage of the converter shown in FIG. 1 at an output frequency of 50 Hz and 5 Hz.
Figure 11:
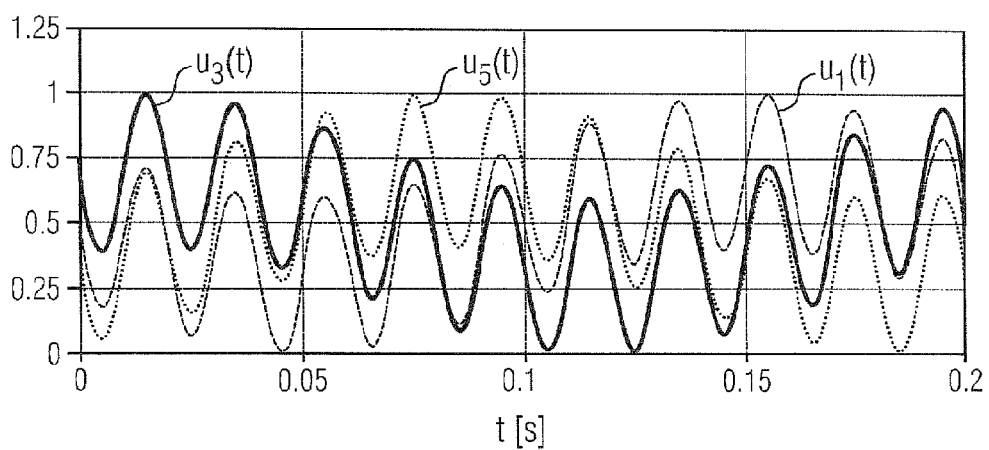
FIG. 11 shows a graph over time t of three valve branch voltages of the converter shown in FIG. 1, in each case with a common mode voltage which is not equal to zero.

The modulation of a common mode voltage $u_{CM}(t)$ forces the onset of an energy interchange between the subsystems 10, 11 and 20, which are in switching state II ($U_x = U_c$), of the phase modules 100 of the polyphase converter shown in FIG. 1 which are connected to the DC voltage busbars $P_0$ and $N_0$. If the potentials of the converter output voltages $u_{10}(t)$, $u_{20}(t)$ and $u_{30}(t)$ are in the vicinity of the DC voltage busbar $P_0$ (FIG. 11), the energy stores 9 and 29, 30 of the subsystems 10, 11 and 20 of the lower valve branches T2, T4, T6 adjust their energy content to one another. If the potential of the converter output voltages $u_{10}(t)$, $u_{20}(t)$ and $u_{30}(t)$ is close to the DC voltage busbar $N_0$ of the polyphase converter shown in FIG. 1, the energy stores 9 and 29, 30 of the subsystems 10, 11 and 20, respectively of the upper valve branches T1, T3 and T5 adjust their energy content to one another.

This adjustment of the energy contents results in an additional valve branch current, which is part of an existing compensating current. In this case, the energy compensation takes place passively, i.e. without any influence by a superimposed open-loop/closed-loop control system. Furthermore, it is also possible to influence the energy compensation in a targeted manner by active influencing of the valve branch currents. In this case, use is made of the method known from German patent specification DE 10 2005 045 090.

However, the common mode voltage $u_{CM}(t)$ can be used irrespective of the type of energy compensation (passive or active). It is only possible to limit the energy deviation of the energy stores by compensating currents in such a way that the level of these compensating currents does not result in unfavorable overdimensioning of the semiconductors by virtue of a simultaneous shift, as a result of a common mode voltage $u_{CM}(t)$, in the potentials of the converter output voltages $u_{10}(t)$, $u_{20}(t)$ and $u_{30}(t)$.

The additional valve branch current results in increased on-state losses and switching losses in the semiconductor switches which can be disconnected of the two-pole subsystems 10, 11 and 20 used. As a result, however, more favorable dimensioning of the energy stores of the subsystems 10, 11 and 20 used is achieved, i.e., this disadvantage is considered to be insignificant in comparison with the advantage (more favorable energy store dimensions).

When selecting amplitude, curve form (sinusoidal, trapezoidal, triangular, . . . ) and frequency of the common mode voltage $u_{CM}(t)$, in principle there are considerable degrees of freedom for the design. The following points play an important role in the dimensioning of the common mode voltage $u_{CM}(t)$:

Advantageously, the maximum rate of change $$\left. \frac{d u_{CM}(t)}{dt} \right|_{max}$$

of the superimposed common mode voltage $u_{CM}(t)$ is selected such that it is not necessary for a plurality of energy stores 9 and 29, 30 of the subsystems 10, 11 and 20 used of a valve branch T1, . . . , T6 to be switched simultaneously in order to follow the predetermined setpoint value characteristic. As a result, the advantage of the lower motor insulation capacity as a result of low sudden voltage change levels in comparison with converters with a low number of stages would sometimes be given up again. In addition, low sudden voltage change levels have a positive effect on the level of the bearing and shaft currents and therefore increase the life of the drive.

The longer the potentials in the vicinity of the connections of the DC voltage busbar $P_0$ or $N_0$ of the polyphase converter shown in FIG. 1 are kept, the better the energy contents of the energy stores 9 and 29, 30 of the submodules 10, 11 and 20, respectively, which are in the switching state II can be matched to one another. For this reason, a trapezoidal curve characteristic of the common mode voltage $u_{CM}(t)$ with a pronounced plateau phase appears to be particularly advantageous, but not absolutely necessary.

The common mode voltage $u_{CM}(t)$ is to be dimensioned such that the resultant valve branch currents do not overshoot maximum values to be predefined.

The common mode voltage $u_{CM}(t)$ needs to be dimensioned such that the resultant voltage ripple $\Delta U$ in the energy stores 9 and 29, 30 of the subsystems 10, 11 and 20, respectively, used does not overshoot maximum values to be predefined.

When using the modulation of a common mode voltage $u_{CM}(t)$ according to the invention, it is necessary to ensure when using standard system motors that the maximum line-to-ground voltage $u_{LE}$ at the motor is not overshot in order not to damage the motor insulation. In the case of an ungrounded converter with DC isolation from the feed system by a feed-side transformer, it is generally the case that the potential of the neutral point of the machine winding is in the vicinity of the ground potential owing to the capacitive ratios. By virtue of the clocking of the converter, the potential ratios are shifted automatically in the converter. As a result, once the positive DC voltage busbar $P_0$ is in the vicinity of the ground potential, and once the negative DC voltage busbar $N_0$ is in the vicinity of the ground potential. In this case, it may arise at high common mode voltages $u_{CM}(t)$ that the total intermediate circuit voltage $U_d$ is present at the machine terminals as line-to-ground voltage $U_{LE}$. In the normal case, the following maximum condition therefore applies for the maximum value $\hat{u}_{LE}$ is of the line-to-ground voltage $u_{LE}$:

$$\hat{u}_{LE} = U_d = \frac{2\sqrt{2}}{\sqrt{3}} U_M$$

where $U_M$: rms value of the line-to-line motor voltage.

Even higher intermediate circuit voltages $U_d$ and therefore higher values for $\hat{u}_{LE}$ are possible, but result in unfavorable design of the converter.

In the case of standard system motors which are designed for operation directly on the sinusoidal supply system, the maximum permissible value $\hat{u}_{LE}$ of the line-to-ground voltage $U_{LE}$ is lower by a factor of 2, however:

$$\hat{u}_{LEsystem} = \frac{\sqrt{2}}{\sqrt{3}} U_M$$

Figure 12:
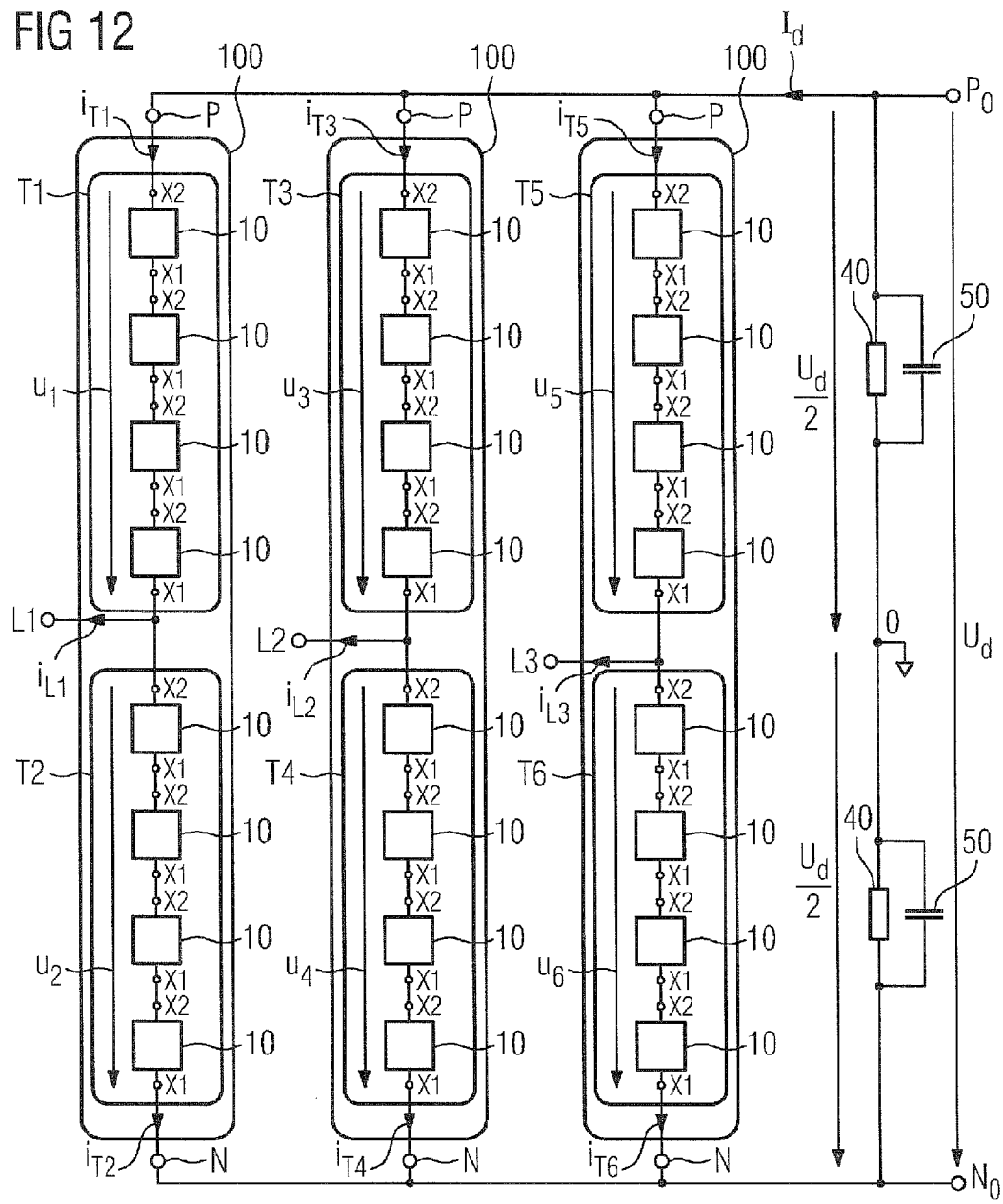
FIG. 12 shows an advantageous embodiment of the three-phase converter shown in FIG. 1.

In order to solve this problem, it is advantageous to connect the fictitious mid-point of the intermediate circuit to the ground potential. This can take place with the aid of a resistor 40, by means of a capacitor 50 or by means of a parallel circuit comprising a resistor 40 and a capacitor 50, as shown in FIG. 12. As a result, the maximum voltage loading is halved and the maximum line-to-ground voltage at the machine terminals can thus be reduced to the maximum value $\hat{u}_{LEsystem}$ in the case of a sinusoidal system feed.

By means of this method according to the invention, the converter known from the conference proceedings relating to the ETG Conference 2002, which converter has a three-phase converter with distributed energy stores as shown in FIG. 1 on the system and load side, can be used as a drive converter which can be run up from standstill. In this application it is possible, even at low frequencies up to the DC operating mode of this converter, for the energy stores 9 and 29, 30 of the subsystems 10, 11 and 20 used to be dimensioned in optimum fashion.

The invention claimed is:

1. A method for controlling a polyphase converter at a first output frequency, the converter comprising at least two phase modules, each phase module having an upper and a lower valve branch, with each of the upper and a lower valve branches each comprising at least two two-pole subsystems connected in series, with each subsystem comprising at least one energy store, the method comprising superimposing a common-mode voltage having a second frequency greater than the first output frequency on a setpoint value of a voltage of the upper and lower valve branches such that a sum of the voltages of the upper and lower valve branch of each phase module is equal to an intermediate circuit voltage of the polyphase converter and that a resulting voltage ripple of the at least one energy store of each subsystem does not exceed a predetermined maximum value.

2. The method of claim 1, wherein the common mode voltage is selected so that resulting valve branch current does not exceed a predetermined maximum value.

3. The method of claim 1, wherein an amplitude of the common mode voltage is inversely proportional to an increase in the output frequency of the polyphase converter.

4. The method of claim 1, wherein the common mode voltage is trapezoidal.

5. The method of claim 1, wherein the common mode voltage is sinusoidal.

6. The method of claim 1, wherein the common mode voltage is triangular.

7. A method for controlling a polyphase converter at a low output frequency, the converter comprising at least two phase modules, each phase module having an upper and a lower valve branch, with each of the upper and a lower valve branches each comprising at least two two-pole subsystems connected in series, the method comprising superimposing a common-mode voltage on a setpoint value of a voltage of the upper and lower valve branches such that a sum of the voltages of the upper and lower valve branch of each phase module is equal to an intermediate circuit voltage of the polyphase converter, wherein the common mode voltage is selected such that, for a maximum value for a line-to-ground voltage across terminals of a connected motor, the following condition is met:

$$\hat{u}_{LE} \le U_d \le \frac{2\sqrt{2}}{\sqrt{3}} U_M$$

where $U_M$ is an RMS value of a line-to-line motor voltage, $\hat{u}_{LE}$ is a maximum value for a line-to-ground voltage, and $U_d$ is a total intermediate circuit voltage.

8. A method for controlling a polyphase converter at a low output frequency, the converter comprising at least two phase modules, each phase module having an upper and a lower valve branch, with each of the upper and a lower valve branches each comprising at least two two-pole subsystems connected in series, the method comprising superimposing a common-mode voltage on a setpoint value of a voltage of the upper and lower valve branches such that a sum of the voltages of the upper and lower valve branch of each phase module is equal to an intermediate circuit voltage of the polyphase converter, wherein the common mode voltage is selected such that, for a maximum value for a line-to-ground voltage across terminals of a motor designed for operating directly off a sinusoidal power supply system, the following condition is met:

$$\hat{u}_{LEsystem} = \frac{\sqrt{2}}{\sqrt{3}} U_M$$

where $U_M$ is an RMS value of a line-to-line motor voltage and $\hat{u}_{LEsystem}$ is a maximum line-to-ground voltage at machine terminals for a sinusoidal system feed.

* * * * *